(12) United States Patent
Kim et al.

(10) Patent No.: US 9,190,851 B2
(45) Date of Patent: Nov. 17, 2015

(54) CALIBRATION AND ASSIGNMENT PROCESSES IN WIRELESS POWER TRANSFER SYSTEMS

(75) Inventors: Dukhyun Kim, Marietta, GA (US); Yun Ho Lee, Alpharetta, GA (US); Youngsik Hur, Alpharetta, GA (US)

(73) Assignee: SAMSUNG ELECTRO-MECHANICS, Gyunngi-Do (KR)

( * ) Notice: Subject to any disclaimer, the term of this patent is extended or adjusted under 35 U.S.C. 154(b) by 854 days.

(21) Appl. No.: 13/435,568

(22) Filed: Mar. 30, 2012

(65) Prior Publication Data

US 2012/0326658 A1 Dec. 27, 2012

Related U.S. Application Data

(60) Provisional application No. 61/500,980, filed on Jun. 24, 2011.

(51) Int. Cl.
*H02J 7/00* (2006.01)
*H02J 7/02* (2006.01)

(52) U.S. Cl.
CPC . *H02J 7/00* (2013.01); *H02J 7/025* (2013.01); *H02J 2007/0096* (2013.01)

(58) Field of Classification Search
USPC .......................................................... 320/108
See application file for complete search history.

(56) References Cited

U.S. PATENT DOCUMENTS

| | | | |
|---|---|---|---|
| 8,853,889 B2 * | 10/2014 | Suzuki et al. | 307/104 |
| 2004/0145342 A1 * | 7/2004 | Lyon | 320/108 |
| 2012/0280650 A1 | 11/2012 | Kim | |
| 2013/0020988 A1 | 1/2013 | Kim | |

\* cited by examiner

*Primary Examiner* — Samuel Berhanu

(57) ABSTRACT

Systems and methods pertaining to wireless power transfer are disclosed. Specifically, disclosed herein are calibration procedures that incorporate transmission of a reference power charge from a wireless power charger to permit determination of an optimized receiver circuitry configuration in one or more wirelessly chargeable devices. The result of the calibration procedures may then be used by the wireless charger to assign various frequencies to several wirelessly chargeable devices so as to optimally transfer a steady state power charge at one or more frequencies to the wirelessly chargeable devices.

16 Claims, 11 Drawing Sheets

CALIBRATION AND ASSIGNMENT PROCESSES IN WIRELESS POWER TRANSFER SYSTEMS

RELATED APPLICATION

The present application claims priority to U.S. Provisional Patent Application No. 61/500,980, filed Jun. 24, 2011, and entitled "RESOURCE ASSIGNMENT AND CALIBRATION FOR A WIRELESS POWER TRANSFER SYSTEM," which is hereby incorporated in its entirety as if fully set forth herein.

DESCRIPTION OF THE RELATED ART

A rechargeable battery contained inside a device may be charged in at least two different ways depending on the circuitry provided in the device.

In the first approach, the rechargeable battery may be charged by connecting a power cable to the device and providing a charging current derived from a fixed power source such as an electrical wall outlet.

In an alternative approach, a rechargeable battery located inside a device may be charged wirelessly by placing the device in proximity to a wireless charging element. Charge transfer from the wireless charging element to the rechargeable battery may be implemented in several different ways, for example, by using an inductive charge coupling mechanism or by using a capacitive charge coupling mechanism.

The wireless charging approach provides several benefits such as for example, eliminating the need for repeatedly plugging and unplugging a device from a wall socket, and in some cases allowing multiple devices to be charged simultaneously from a single electrical wall outlet. Simultaneous charging of multiple devices may be carried out for example, by placing the multiple devices side by side upon a charging mat.

Unfortunately, existing wireless charging systems suffer from certain handicaps as well. For example, a rechargeable battery located in a receiving device is typically provided a charge via a resonant circuit that may be tuned to a certain frequency at which the receiving device expects to receive a wireless charge. However, some wireless chargers may transmit the wireless charge at a different frequency that is incompatible with the resonant circuit located in the receiving device, thereby leading to a loss of efficiency in the charge transfer, or in some cases, a complete inability to carry out the charge transfer.

SUMMARY

According to a first aspect of the disclosure, a system includes a wireless charger. The wireless charger contains a power charge transmitter and a controller unit. The controller unit is used to configure the power charge transmitter to transmit a reference wireless power charge at a first frequency. The reference wireless power charge permits one or more wirelessly chargeable devices to execute a calibration procedure According to a second aspect of the disclosure, a method includes the steps of transmitting from a wireless charger, a reference wireless power charge at a first frequency for a certain period of time, the reference wireless power charge operative to permit one or more wirelessly chargeable devices to execute a calibration procedure associated with wireless power charging of the one or more wirelessly chargeable devices; discontinuing transmitting of the reference wireless power charge after the period of time; and transmitting a steady-state wireless power charge at the first frequency for transferring power to the wirelessly chargeable device(s).

According to a third aspect of the disclosure, a system includes a wireless charger configured to transmit a first reference wireless power charge at a first frequency, the first reference wireless power charge operative to permit one or more wirelessly chargeable devices to execute a calibration procedure prior to receiving a first steady-state wireless power charge from the wireless charger at the first frequency; and further configured to transmit a second reference wireless power charge at a second frequency, the second reference wireless power charge operative to permit the same wirelessly chargeable devices to execute the calibration procedure prior to receiving a second steady-state wireless power charge from the wireless charger at the second frequency.

Further aspects of the disclosure are shown in the specification, drawings and claims below.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts, or descriptively similar parts, throughout the several views and embodiments.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that terminology such as power, voltage, current, power transfer, chargeable, rechargeable, charging, and coupling are used herein as a matter of convenience for description purposes and should not be interpreted in a limiting manner. The phrase "power transfer" may be interchangeably referred to herein in various ways such as for example, "wireless charging," or "charge transfer." Also, the term "chargeable" may be used interchangeably with the term "rechargeable" as a matter of convenience. One of ordinary skill in the art will recognize that the phrase "charging a battery" may be alternatively referred to as "recharging the battery." Hence, the various phrases and terms used herein should be interpreted solely to understand the invention rather than to limit the scope of the concept.

It must also be understood that the word "example" as used herein (in whatever context) is intended to be non-exclusionary and non-limiting in nature. Specifically, the word "exemplary" indicates one among several examples, and it must be understood that no special emphasis is intended or suggested for that particular example. A person of ordinary skill in the art will understand the principles described herein and recognize that these principles can be applied to a wide variety of applications using a wide variety of physical elements.

The various embodiments generally describe systems and methods related to wireless power transfer. In particular, described herein are some systems and methods pertaining to calibration procedures and assignment procedures in a wireless power transfer system.

Figure 1:
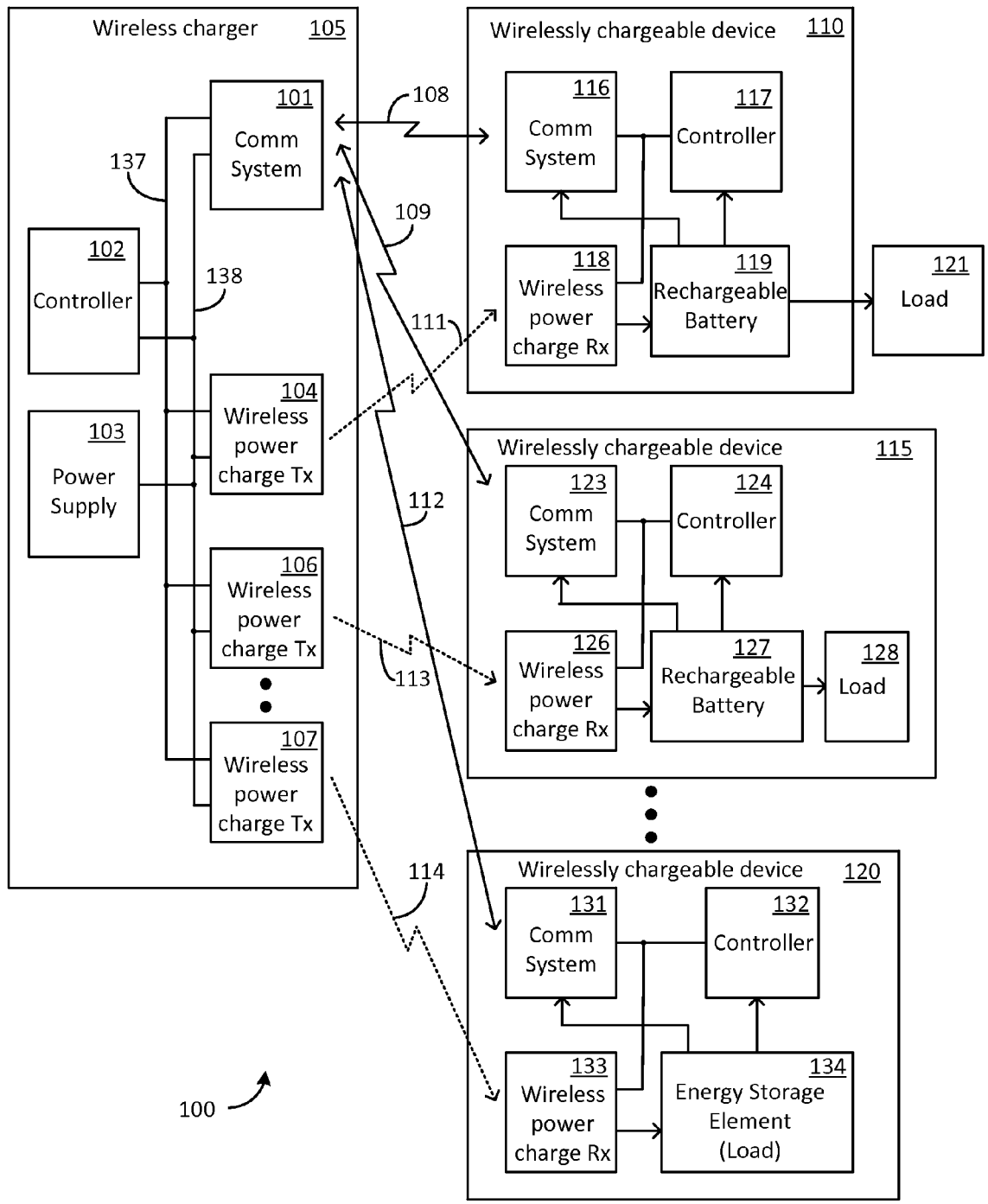
FIG. 1 shows a wireless power transfer system that includes a wireless charger that provides power to a number of wirelessly chargeable devices in accordance with invention.

Attention is now drawn to FIG. 1, which shows a wireless power transfer system 100 in accordance with the invention. Wireless power transfer system 100 includes a wireless charger 105 that is used to communicate with multiple wireless chargeable devices, and to provide power for charging one or more rechargeable batteries contained in each of the wireless chargeable devices.

While the exemplary embodiment shown in FIG. 1 indicates wireless charger 105 as being used to charge multiple wireless chargeable devices, in other embodiments, wireless charger 105 may be used to charge a single wireless chargeable device. The various wireless chargeable devices may be similar to one another or may be different from one another (such as for example, wireless chargeable devices 110 and 120). These aspects will be addressed below in further detail. It should be noted that in some cases, the description below refers to wirelessly chargeable device 110. However, it will be understood that this has been done solely for purposes of convenience, and the description may be equally applicable to the other wirelessly chargeable devices as well.

Wireless charger 105 includes a wireless communication system 101, a controller 102, a power supply 103 and multiple wireless power charge transmitters. Controller 102 is communicatively coupled via a communication bus 137 to wireless communication system 101 and to each of the wireless power charge transmitters. Power supply 103, which may be powered from an AC mains source and may include batteries, is coupled via a power bus 138 to controller 102, wireless communication system 101 and each of the wireless power charge transmitters.

Wireless chargeable device 110 includes a communication system 116, a controller 117, a rechargeable battery 119, a wireless power charge receiver 118, and a load 121. Controller 117 is communicatively coupled to wireless communication system 116 and wireless power charge receiver 118 to provide control and communication functionality. Wireless power charge receiver 118 includes suitable circuitry to receive a power charge. Such circuitry may include a receiving element (not shown) for receiving the power charge transmitted from wireless charger 105. The receiving element may incorporate a tunable circuit, such as a resonant circuit (not shown) that provides for inductive and/or capacitive power coupling between a wireless power charge transmitter, such as for example, wireless power charge transmitter 104, and wireless power charge receiver 118.

The received power charge is provided to rechargeable battery 119, which in turn provides power to load 121 and to various elements contained in wireless chargeable device 110. It will be understood that load 121 is a symbolic representation of any circuitry that draws power from rechargeable battery 119.

In a first embodiment as shown in wirelessly chargeable device 110, load 121 may be disconnected from rechargeable battery 119, for example when rechargeable battery 119 is being charged. As one example of this first embodiment, load 121 may be a cordless drill that is detachable from a battery module (i.e. wirelessly chargeable device 110).

In a second embodiment as shown in wirelessly chargeable device 115, load 128 remains connected to rechargeable battery 127 all the time. As one example of this second embodiment, load 128 may be the various parts (circuitry, speaker, display, etc.) of a cellular phone with rechargeable battery 127 located inside the cellular phone enclosure. As can be understood, rechargeable battery 127 is normally not removed from the cellular phone enclosure for purposes of charging.

In a third embodiment as shown in wirelessly chargeable device 120, load 134 is an energy storage element (instead of a battery) that may incorporate various energy storage components such as, for example, capacitors and inductors. The energy stored in the energy storage element may be subsequently used to power various elements such as controller 132 and wireless communication system 131.

Operational aspects of wireless power transfer system 100 will now be explained. Communications system 101, which may be referred to herein as master wireless communication system 101, wirelessly communicates with the communication systems contained in each of the wirelessly chargeable devices. The wireless communication systems contained in each of the wirelessly chargeable devices may be referred to herein as slave wireless communication systems. As shown, master wireless communication system 101 communicates with slave wireless communication system 116 via communication link 108; with slave wireless communication system 123 via communication link 109; and with slave wireless communication system 131 via communication link 112.

Master wireless communication system 101 is configured to communicate with the slave wireless communication systems using any of various communication protocols. Preferably, a selected communication protocol accommodates multiple, and in some cases simultaneous, communications interaction between master wireless communication system 101 and the various slave wireless communication systems.

Once communication is established, a calibration mode of operation may be employed whereby wireless charger 105 transmits a reference wireless power charge that may be used by one or more wirelessly chargeable devices to calibrate receiving circuitry in order to maximize the amount of power transferred from wireless charger 105 to the one or more wirelessly chargeable devices. The calibration procedure is described below in further detail.

The calibration mode of operation may be followed by a wireless power charge transfer mode of operation whereby wireless charger 105 provides a power charge (referred to henceforth as a "steady state power charge") for charging one or more of the rechargeable batteries or storage elements located in one or more of the wirelessly chargeable devices. This process is carried out by transmitting power at specific frequencies and power levels from individual wireless power charge transmitters located in wireless charger 105 to corresponding wireless power charge receivers located in the wirelessly chargeable devices.

Specifically, wireless power charge transmitter 104 transfers power into wireless power charge receiver 118 using a suitable charge coupling circuit (not shown) that is specifically designed to accommodate power transfer at one or more selected frequencies. In one exemplary embodiment, a default frequency is used to transmit the reference wireless power charge for calibration purposes to one or more wireless power charge receivers, after which the default frequency may be changed to another frequency for providing a steady state power charge to wireless power charge receiver 118 without interfering with any power transfer being carried out to any of the other wireless power charge receivers.

Thus, in one scenario, each of power transfer links 111, 113 and 114 may be configured during one period of time to simultaneously transfer power at the default frequency, but may be subsequently reconfigured to transfer power at other individual frequencies. When subsequently reconfigured, the frequency used on power transfer link 111 may be different from that used on power transfer link 113, thereby eliminating/reducing interference between the power transfer processes carried out over the two power transfer links. The frequency reconfiguration may be carried out by incorporating various elements (not shown) such as variable capacitors, variable inductors, and switches in the wireless power charge transmitters and receivers.

In certain embodiments, the default conditions and/or values of these elements may be selected so as to permit power transfer at the default frequency. For example, when no power is available in wirelessly chargeable device 110, the default condition of a switch and/or a default value of a variable capacitor located in a receiving element of wireless power charge receiver 118 may be selected so as to accommodate power transfer at the default frequency from wireless power charge transmitter 104 to wireless power charge receiver 118.

Figure 2:
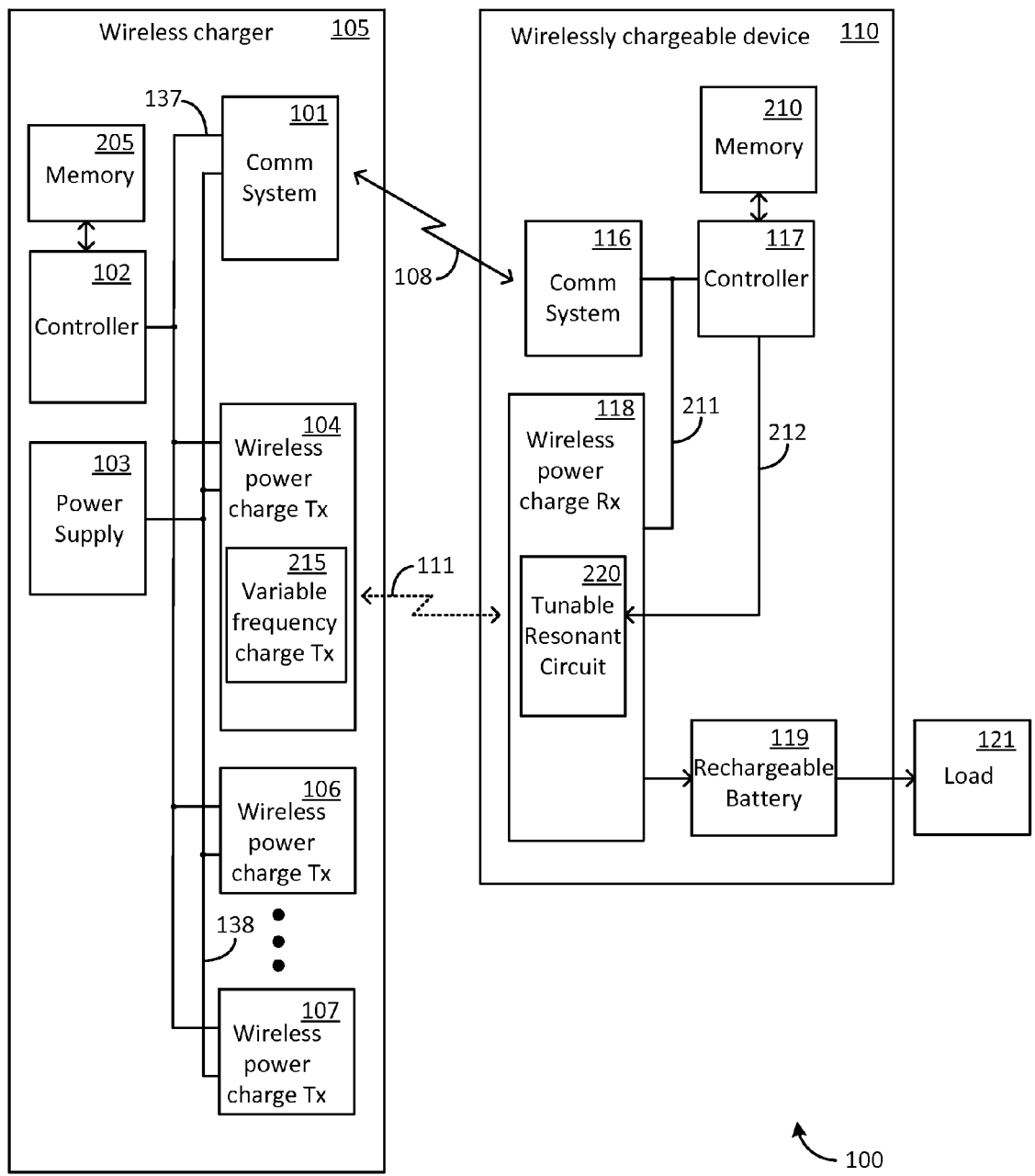
FIG. 2 shows certain additional elements contained in the wireless charger and an exemplary wirelessly chargeable device of the wireless power transfer system shown in FIG. 1.

Attention is now drawn to FIG. 2, which shows certain additional elements of wireless power transfer system 100, and specifically contained in wireless charger 105 and wirelessly chargeable device 110, that are used for implementing the calibration mode of operation and the steady state power charge transfer mode of operation referred to above.

Wireless charger 105 includes a memory 205 and a variable frequency power charge transmitter 215, while wirelessly chargeable device 110 includes a memory 210 and a tunable resonant circuit 220.

Memory 205 is coupled to controller 102 so as to enable controller 102 to store and access various types of data, such as, for example, calibration data, power level data, frequency data and messaging data.

Variable frequency power charge transmitter 215 is used to generate and transmit a power charge at a desired power level and frequency. In one exemplary implementation, the frequency is settable by controller 102 via communication link 137. In this implementation, variable frequency power charge transmitter 215 may include a programmable frequency generator, such as for example one incorporating a frequency synthesizer, that is settable via binary values received through communications link 137.

In another exemplary implementation, the frequency is settable by controller 102 via a control line (not shown) that propagates an analog control signal to a tunable element that is a part of variable frequency power charge transmitter 215. For example, the tunable element may be a variable capacitor (e.g., a varicap) whose capacitance value is determined by a control voltage applied to the variable capacitor; or a variable capacitor comprising several capacitors and switches, wherein the control signal is a switch control signal and one or more switches are manipulated for obtaining a desired capacitance value. As another example, the tunable element may be a variable inductor whose inductance value is determined by selecting a suitable tap point on the variable inductor. The tap point may be selected either via a controllable slider or by manipulating one or more switches.

Turning now to wirelessly chargeable device 110, tunable resonant circuit 220 incorporates one or more tunable elements, such as for example, variable capacitors, variable inductors and variable resistors. The tunable elements are used to set tunable resonant circuit 220 to resonate at various frequencies (via the variable capacitors and/or inductors) and at various values of quality factor Q (via the variable resistor).

In one exemplary implementation, the resonant frequency is settable by controller 117 via communication link 211. In this implementation, tunable resonant circuit 220 includes a digitally variable element, such as a digital resistor or a digital-to-analog converter that provides a control signal to control a voltage controlled capacitor. The digitally variable element is settable via binary values received through communications link 211.

In another exemplary implementation, the frequency is settable by controller 117, via control line 212, that propagates an analog control signal to a tunable element that is a part of tunable resonant circuit 220. For example, the tunable element may be a variable capacitor (e.g., a varicap) whose capacitance value is determined by a control voltage applied to the variable capacitor; or a variable capacitor comprising several capacitors and switches, wherein the control signal is a switch control signal and one or more switches are manipulated for obtaining a desired capacitance value. As another example, the tunable element may be a variable inductor whose inductance value is determined by selecting a suitable tap point on the variable inductor. The tap point may be selected either via a controllable slider or by manipulating one or more switches.

Various values associated with setting tunable resonant circuit 220 may be stored in memory 210. For example, in a first embodiment, one or more digital control values that are provided to tunable resonant circuit 220 may be stored in memory 210. In a second embodiment, one or more analog control values that are provided to tunable resonant circuit 220 may be stored in memory 210 in a digital format. In a third embodiment, one or more settings (for example, switch settings or tap settings) may be stored in memory 210. In a fourth embodiment, one or more capacitance values and/or one or more inductance values may be stored in memory 210.

The capacitance and/or inductance values may be measured using suitable measuring circuitry (not shown) or may be determined by other means.

In addition to the various values described above that are associated with settings of tunable resonant circuit 220, memory 210 is also used to store various retrieved power level values. A retrieved power level value refers to a power level present at an output node (not shown) of tunable resonant circuit 220 when wirelessly chargeable device receives the reference wireless power charge transmitted by wireless charger 105 for permitting wirelessly chargeable device 110 to carry out a calibration procedure.

The retrieved power values are measured using suitable circuitry (not shown) and these measured values are stored by controller 117 in memory 210, typically in a table format. The table provides information that matches various settings values (described above) of tunable resonant circuit 220 to respective retrieved power levels. Controller 117 can access memory 210 to process and determine an optimal retrieved power level ($P_{optimal}$) and an associated setting value ($V_{optimal}$), for example, a value of a capacitor, a value of an inductor, or a switch setting that was used to obtain the optimal retrieved power level.

Figure 3:
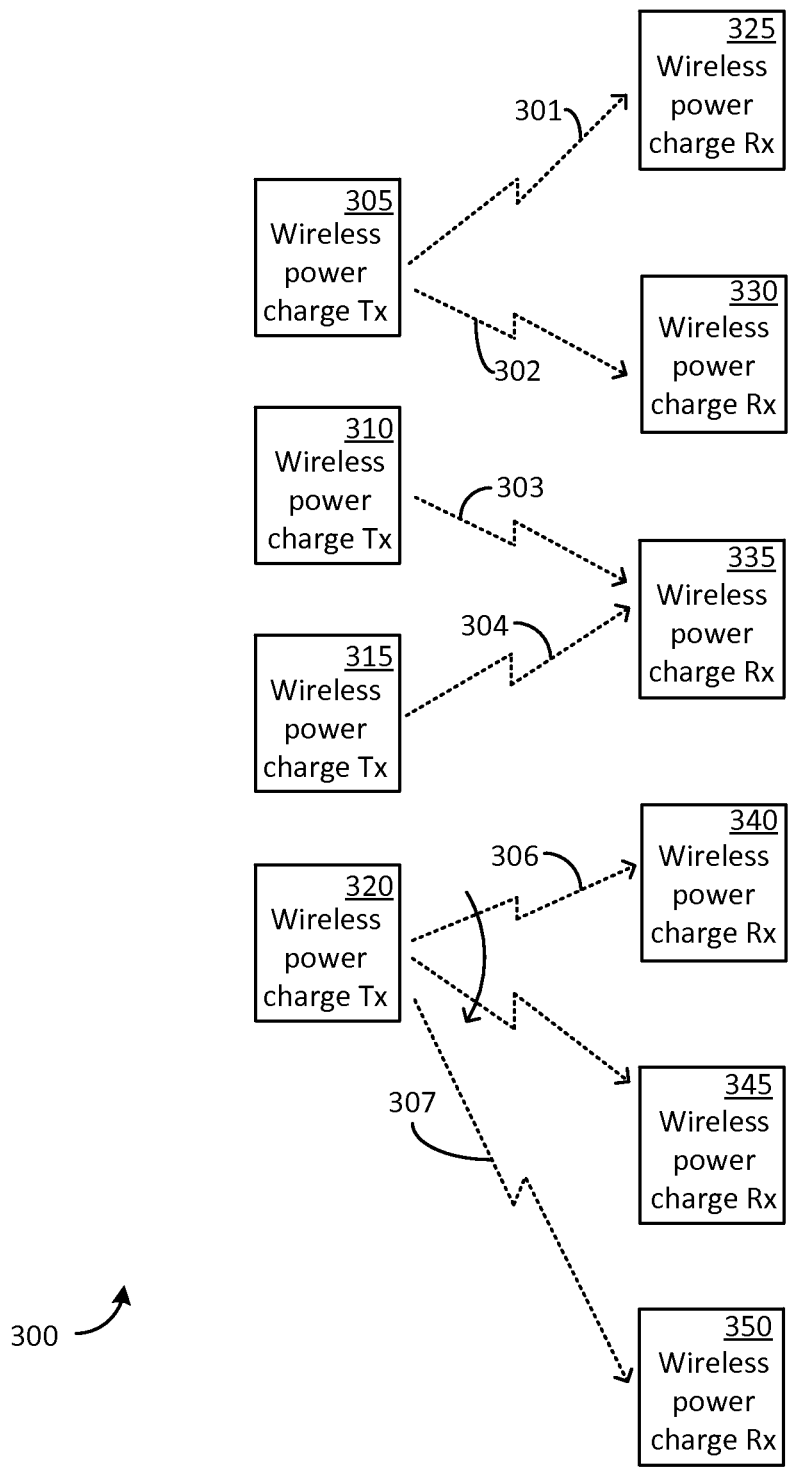
FIG. 3 shows various configurations that may be used to provide wireless power charge to a number of wireless chargeable devices in accordance with invention.

FIG. 3 shows a wireless power transfer system 300 that includes a number of wireless power charge transmitters, which may be all incorporated into a single wireless charger or may be located in multiple wireless chargers. The wireless power charge transmitters are configured to provide wireless power charges to a number of wireless power charge receivers that are each incorporated into a corresponding number of wirelessly chargeable devices. Various configurations are shown in order to describe the various ways in which power can be transferred from the wireless power charge transmitters to the wireless power charge receivers.

Wireless power charge transmitter 305 provides power charge to wireless power charge receiver 325, as well as to wireless power charge receiver 330 via wireless links 301 and 302 respectively. Providing the power charge may include providing a reference charge to permit each of the two receivers to perform calibration and subsequently providing a steady state power charge using optimal circuitry in each of the two receivers.

In one embodiment, the calibration is carried out in each of the receivers sequentially. Specifically, wireless power charge receiver 325 is configured to receive and use the reference charge transmitted at a first frequency while wireless power charge receiver 330 is disabled. Wireless power charge receiver 330 is then provided with the reference charge at a different frequency, with wireless power charge receiver 325 disabled. This embodiment permits providing of steady state charges at two different frequencies to the two receivers.

In another embodiment, the calibration is concurrently carried out in each of wireless power charge receivers 325 and 330 with the reference charge provided at a first frequency. The first frequency may then be used to transmit a steady state charge to both receivers concurrently.

Wireless power charge transmitter 310 provides power charge solely to wireless power charge receiver 335, via wireless link 303. However, wireless power charge transmitter 315 is also configured to provide power charge to wireless power charge receiver 335. In this configuration, one of the two power charge transmitters may operate as an active charge transmitter while the other transmitter acts as a backup transmitter. This configuration may be adopted for example, when wireless power charge receiver 335 is a high priority device requiring uninterrupted power charging.

Wireless power charge transmitter 320 provides power charge to wireless power charge receiver 340 and wireless power charge receiver 345 via wireless link 306, and additionally provides power charge to wireless power charge receiver 350 via wireless link 307. However, in contrast to the arrangement described above vis-à-vis wireless power charge transmitter 305 that can provide power charge to wireless power charge receiver 325 and wireless power charge receiver 330 concurrently, wireless power charge transmitter 320 provides power charges to wireless power charge receiver 340 and wireless power charge receiver 345 in a time multiplexed manner via wireless link 306.

Consequently, in one embodiment, wireless power charge transmitter 320 uses wireless link 306 to first provides a power charge (steady state and/or reference charge) to wireless power charge receiver 340 and subsequently uses the same wireless link 306 to provide a power charge (steady state and/or reference charge) to wireless power charge receiver 345. The power charge to wireless power charge receiver 345 may be provided after charging is completed in wireless power charge receiver 340, or may be carried out in a time-shared manner, switching back and forth, until both receivers are fully charged.

In addition to providing power charges in a time multiplexed format to wireless power charge receiver 340 and wireless power charge receiver 345, wireless power charge transmitter 320 provides a charge to wireless power charge receiver 350. The power charges to each of receivers 340, 345 and 350 may use a single frequency or may use multiple frequencies.

Figure 4:
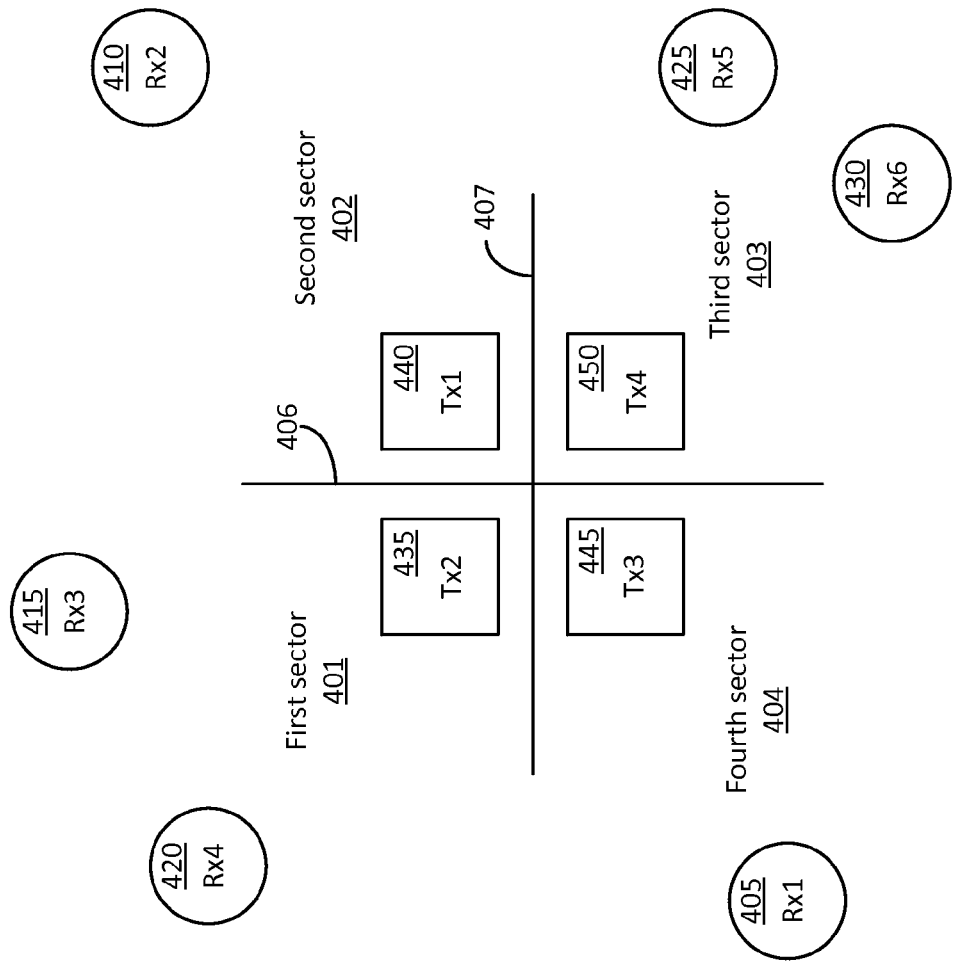
FIG. 4 shows a first exemplary embodiment wherein a number of wireless power charge transmitters are arranged in a first configuration to provide wireless power charge to a number of wireless chargeable devices in accordance with invention.

FIG. 4 shows a wireless power transfer system 400 that includes a number of wireless power charge transmitters, which may be all incorporated into a single wireless charger or may be located in multiple wireless chargers. The wireless power charge transmitters are arranged in a sectorized configuration that provides power charges to a number of wireless power charge receivers in their respective sectors.

Specifically, wireless power charge transmitter 435 is configured to provide power charges to wireless power charge receiver 420 and wireless power charge receiver 415 that are located in a first sector 401. Wireless power charge transmitter 440 is configured to provide power charge to wireless power charge receiver 410 located in a second sector 402. Wireless power charge transmitter 450 is configured to provide power charges to wireless power charge receiver 425 and wireless power charge receiver 430 that are located in a third sector 403. Wireless power charge transmitter 445 is configured to provide power charge to wireless power charge receiver 405 located in a fourth sector 404.

It will be understood that FIG. 4 showing a four sector arrangement represents one embodiment among several embodiments. In the other embodiments, more or less than four sectors may be employed, and the number of receivers serviced in each sector may vary from one embodiment to another.

Figure 5:
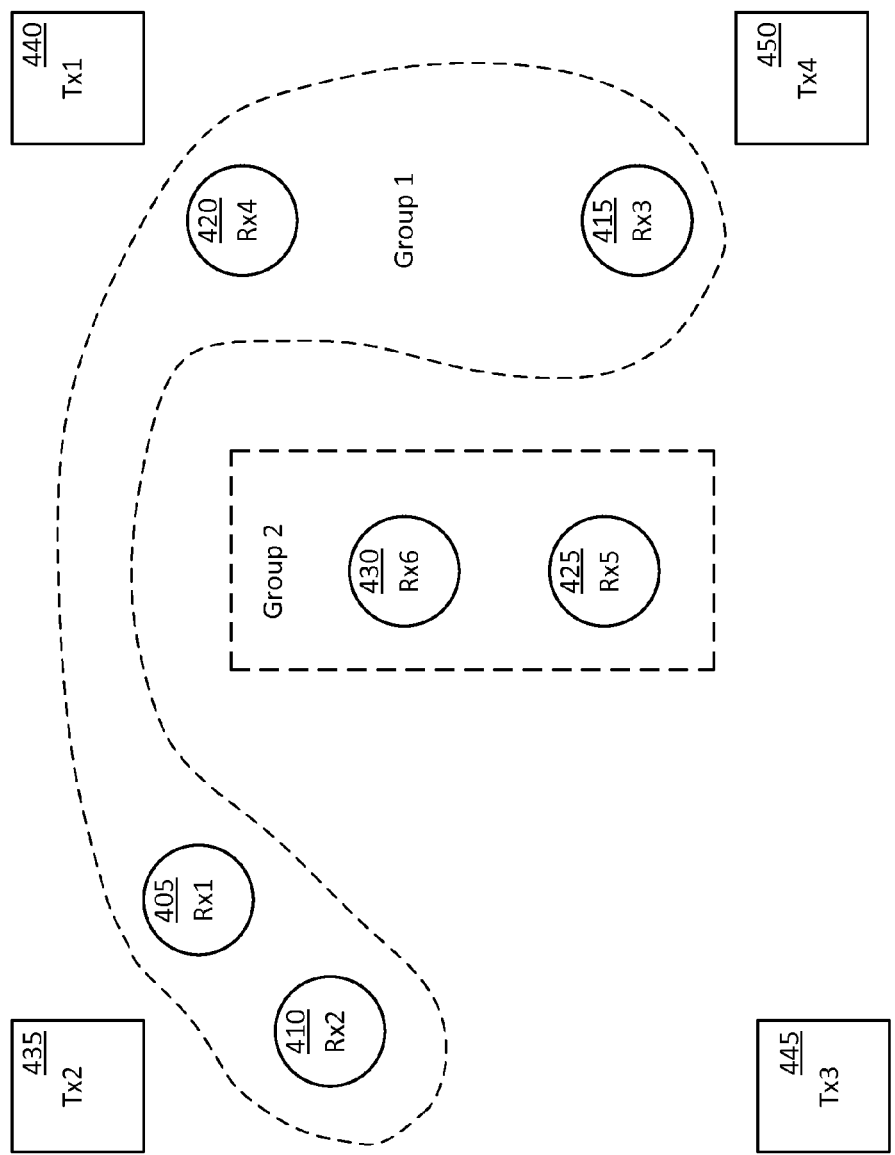
FIG. 5 shows a second exemplary embodiment wherein a number of wireless power charge transmitters are arranged in a second configuration to provide wireless power charge to a number of wireless chargeable devices in accordance with invention.

FIG. 5 shows a wireless power transfer system 500 that includes a number of wireless power charge transmitters arranged in peripheral locations of a service coverage area in which several wireless power charge receivers may be provided power charges in various ways. These various ways, includes the use of one or more frequencies, one or more shared charging arrangements and one or more transmission arrangements (concurrent, multiplexed etc.).

Wireless power transfer system 500 may also incorporate a grouping arrangement, in which multiple groups are defined, with one or more wireless power charge receivers designated as belonging to one or more of the multiple groups. In a first exemplary embodiment, wireless power charge receivers 405, 410, 415 and 420 are designated as belonging to a first group (Group 1), while wireless power charge receivers 430 and 425 are designated as belonging to a second group (Group 2). The grouping arrangement allows power charges to be provided one group at a time, in a time multiplexed format that is described below in more detail.

It can be seen in the exemplary embodiment of FIG. 5 that the number (M) of wireless power charge transmitters is less than the number (N) of wireless power charge receivers (i.e. M<N). However, in other embodiments, M≥N. Notwithstanding the relationship between M and N, calibration procedures may be performed one group at a time.

In one embodiment, all the wireless power charge receivers of Group 1 are provided with a reference power charge at a first frequency. During this time, the wireless power charge receivers of Group 2 are suitably disabled so as to avoid receiving of the reference power charge at the first frequency. The disabling may be carried out in a variety of ways, for example, by disconnecting power to one or more elements contained in the wireless power charge receivers; by using one or more disable signals on logic circuitry (a receiver gate for example); by de-tuning a resonant circuit such the de-tuned resonant circuit is unable to propagate the first frequency; and/or by activating one or more switches to disconnect one or more elements contained in the wireless power charge receivers.

After calibration of the wireless power charge receivers of Group 1 is completed, wireless power charge receivers of Group 2 are provided the reference power charge. At this time, the wireless power charge receivers of Group 1 are disabled in the manner described above vis-à-vis Group 2.

In one implementation, after calibration of the wireless power charge receivers of both Group 1 and Group 2 is completed, a reassignment of groups may be carried out based on certain criteria such as, for example, device priority, power transmission requirements, number of available transmitters. After reassignment into groups (two or more), the calibration procedure described above may be repeated so as to re-calibrate the various wireless power charge receivers in the reassigned groups.

After the reassignment and calibration procedure has been completed, the wireless power charge receivers of a first group may be provided with a steady state power at the first frequency, while wireless power charge receivers of a second group may be provided with a steady state power charge at the second frequency. The steady state power may be provided concurrently to both groups (or to more than two groups, if more than two groups have been formed).

Figure 6A:
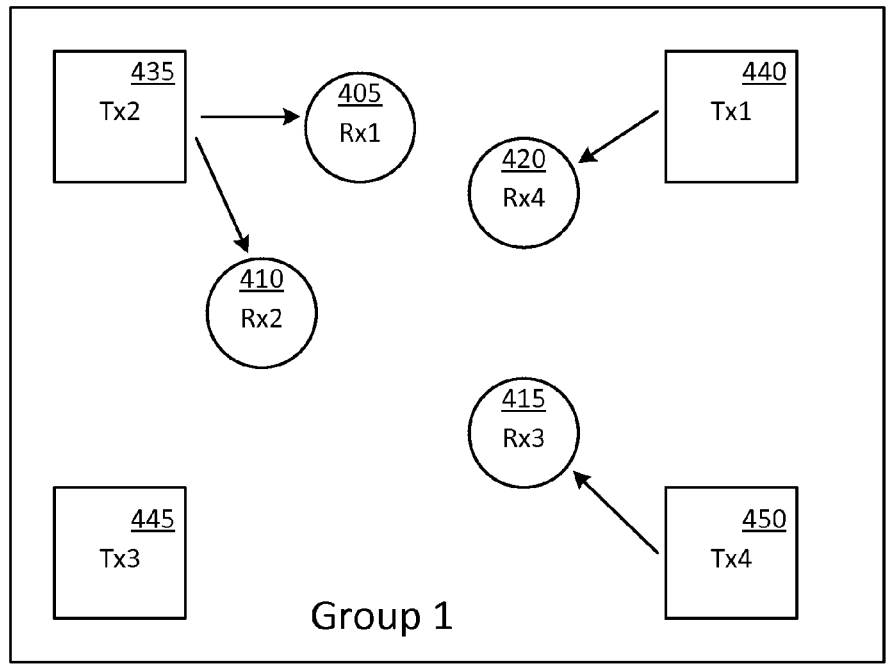
FIGS. 6A-B show a third exemplary embodiment wherein a number of wireless power charge transmitters are arranged in a third configuration to provide wireless power charge to a number of wireless chargeable devices in accordance with invention.
Figure 6B:
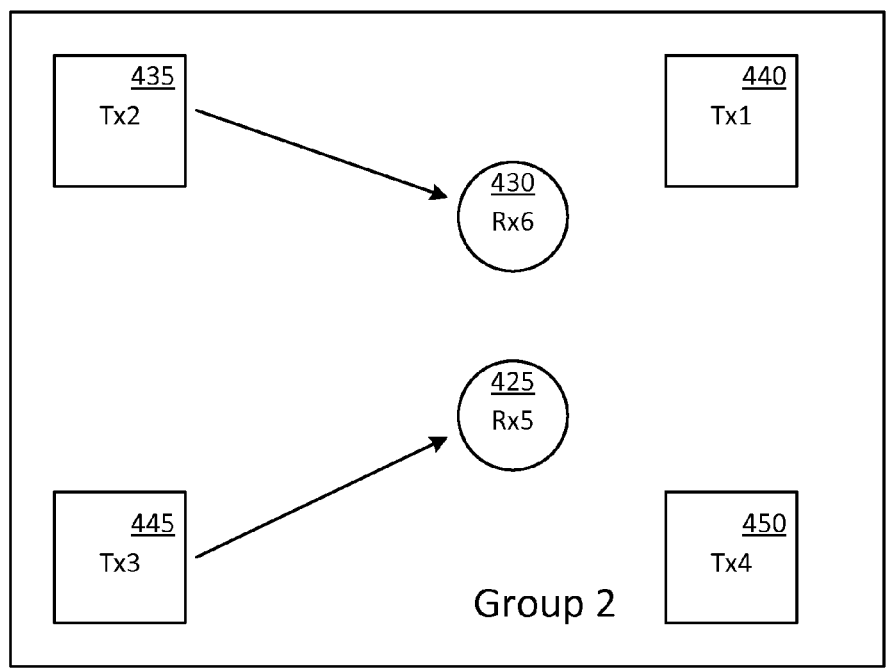

In an alternative embodiment that is shown in FIGS. 6A and 6B, a time multiplexed charging procedure is used whereby the wireless power charge receivers of Group 1 are provided a steady state power at a first frequency for a first period of time, referred to herein as time slot number 1, and the wireless power charge receivers of Group 2 are provided a steady state power charge at the first frequency for a second period of time referred to herein as time slot number 2. It can be understood that this time multiplexed charging procedure using time slots can be extended to a larger number of groups (greater than two) and may incorporate more than one frequency. For example, the charging procedure for the devices shown in FIG. 6A may use a first frequency, while the charging procedure for the devices shown in FIG. 6B may use a different frequency.

It will be also noted from FIGS. 6A and 6B, that the steady state power charges and/or the reference power charges may be provided by several wireless power charge transmitters. As shown, the steady state power charges provided to the wireless power charge receivers of Group 1 are provided by wireless power charge transmitters 435, 440 and 450 (wireless power charge transmitter 445 not used), and the steady state power charges provided to the wireless power charge receivers of Group 2 are provided by wireless power charge transmitters 435 and 445 (wireless power charge transmitters 440 and 450 not used). This type of arrangement provides various advantages, such as for example, load balancing thereby ensuring that one or more of the wireless power charge transmitters do not get overburdened; or for avoiding interference issues during transmission at various frequencies; and/or for charging various wireless power charge receivers based on their position vis-à-vis the various wireless power charge transmitters.

Figure 7:
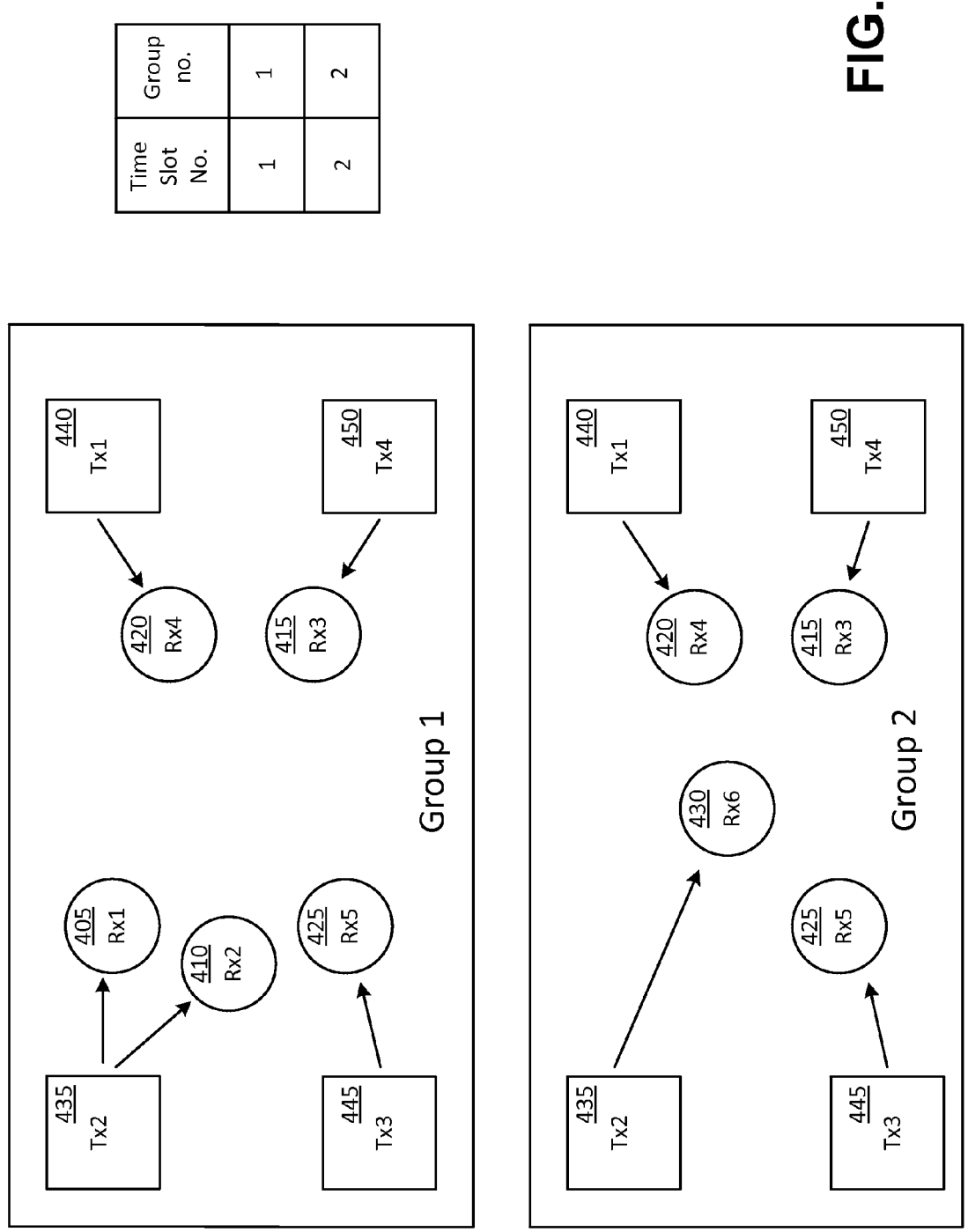
FIG. 7 shows a fourth exemplary embodiment wherein a number of wireless power charge transmitters are arranged in a fourth configuration to provide wireless power charge to a number of wireless chargeable devices in accordance with invention.

FIG. 7 shows a first optimized time multiplexed arrangement for providing power charge to several wireless power charge receivers in an optimized manner. Unlike the arrangement shown in FIGS. 6A and 6B, where one or more wireless power charge transmitters are unused in each of the two time slots, the optimized arrangement uses each of the wireless power charge transmitters during both time slots. This aspect may be understood by noticing that wireless power charge transmitter 445 is utilized for providing power charge to wireless power charge receiver 425 during time slot 1 as well as during time slot 2.

Furthermore, it will be understood that the grouping of the various wireless power charge receivers shown in FIG. 7 is made on the basis of time slots rather than on an absolute basis as described above with reference to FIG. 5 (which may or may not incorporate a time multiplexed arrangement for delivering power charge to the various wireless power charge receivers).

This aspect may be further understood by noticing that unlike in FIG. 5 wherein wireless power charge receiver 425 is assigned exclusively to Group 2, in FIG. 7, wireless power charge receiver 425 is assigned to Group 1 as well as Group 2, and is provided a power charge during both time slot 1 and time slot 2 when these two groups are serviced respectively.

Figure 8:
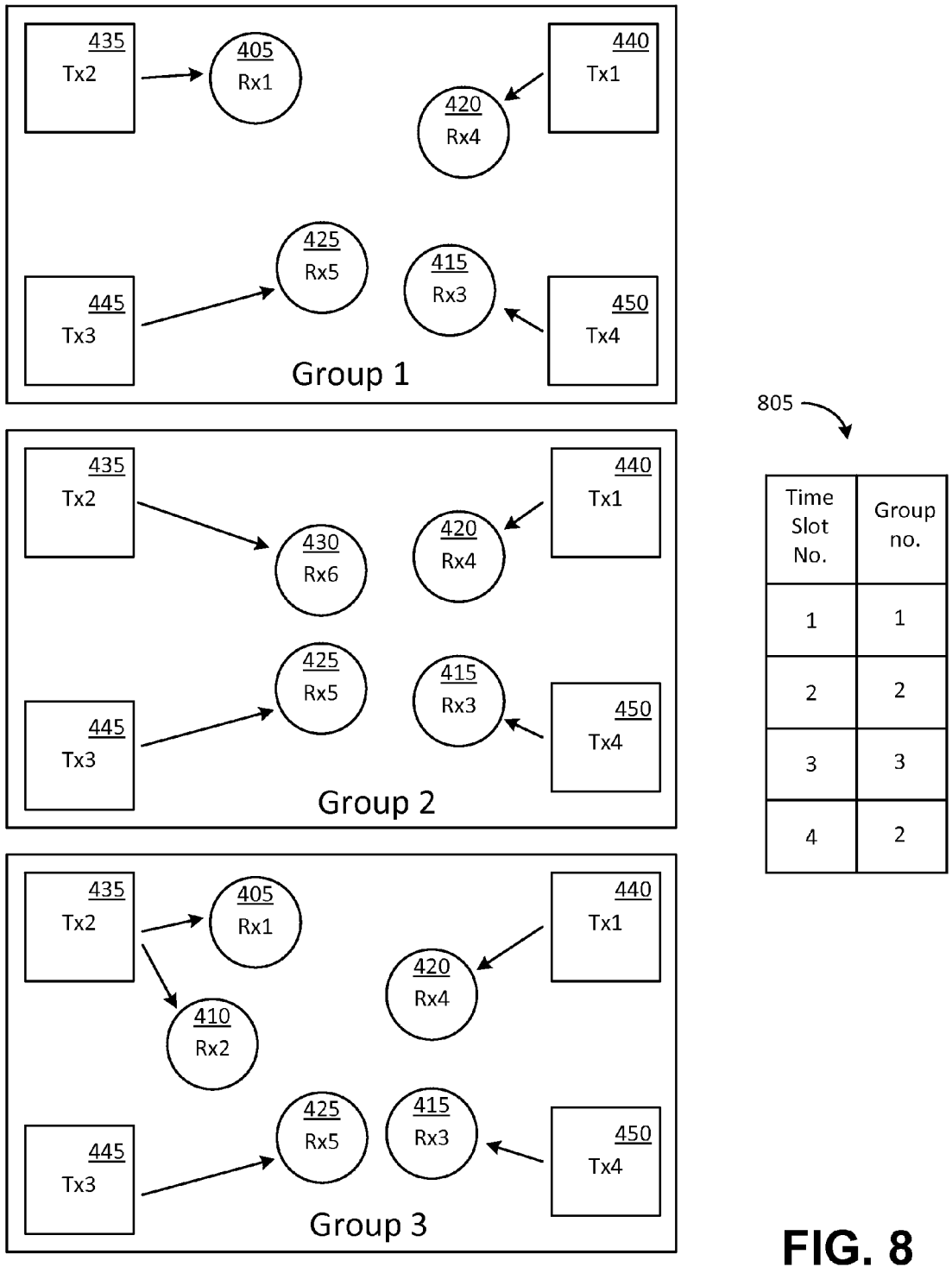
FIG. 8 shows a fifth exemplary embodiment wherein a number of wireless power charge transmitters are arranged in a fifth configuration to provide wireless power charge to a number of wireless chargeable devices in accordance with invention.

FIG. 8 shows a second optimized time multiplexed arrangement for providing power charge to several wireless power charge receivers in another optimized manner. In this exemplary embodiment, unlike FIG. 7 wherein two groups are shown, three groups are used and four time slots (rather than two) are utilized.

Table 805 shows the time slot numbers and corresponding groups that are serviced during these time slots. The second optimized time multiplexed arrangement permits prioritizing service to various wireless power charge receivers on a group basis. In the exemplary arrangement shown in FIG. 8, the wireless power charge receivers in Group 2 are granted a higher priority than the wireless power charge receivers in the other two Groups. Consequently, as can be understood from table 805, the wireless power charge receivers in Group 2 are provided a power charge more frequently (time slots 2 and 4) than the wireless power charge receivers in Group 1 (time slot 1) and the wireless power charge receivers in Group 3 (time slot 3).

It will also be understood that the various time slots do not have to be necessarily of the same duration. Thus, for example, time slots 2 and 4 may each have a longer duration than time slots 1 and/or time slot 3. The longer duration may be based on prioritizing the wireless power charge receivers of Group 2 at a higher level than the wireless power charge receivers of the other two groups.

Figure 9A:
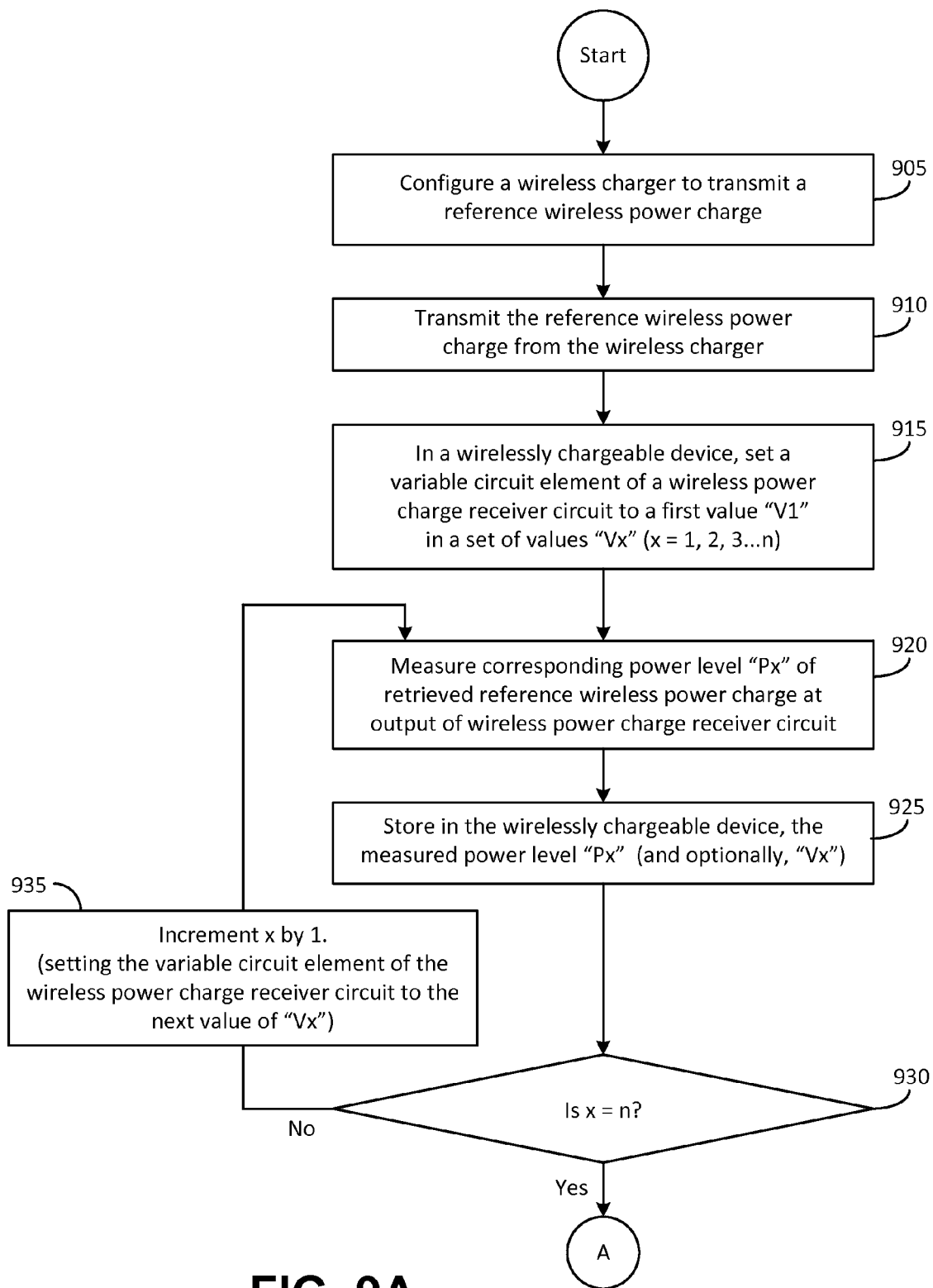
FIGS. 9A-B show an exemplary flowchart for a method for executing a calibration procedure in accordance with the invention.
Figure 9B:
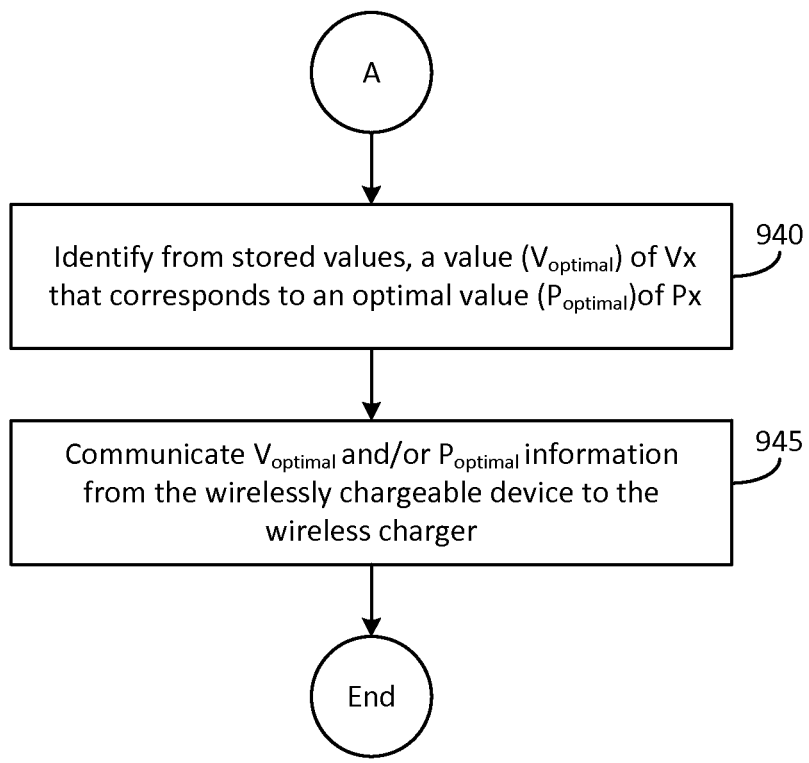

FIGS. 9A and 9B show a flowchart for an exemplary method of carrying out a calibration procedure in accordance with the invention. It is to be understood that any method steps or blocks shown in FIGS. 9A-B (as well as FIG. 10) may represent modules, segments, or portions of code that include one or more executable instructions for implementing specific logical functions or steps in the method. In certain implementations, one or more of the steps may be performed manually. It will be appreciated that, although particular example method steps are described below, additional steps or alternative steps may be utilized in various implementations without detracting from the spirit of the invention. Moreover, steps may be executed out of order from that shown or discussed, including substantially concurrently or in reverse order, depending on various alternative implementations. Code may be also contained in one or more devices, and may not be necessarily confined to any particular type of device. The explanation below, while possibly implying code residency and functionality in certain devices, does so solely for the purposes of explaining concepts behind the invention, and should not be construed in a limiting manner.

FIGS. 9A and 9B will now be described mainly in conjunction with FIG. 2, which shows certain elements that may be used to implement the exemplary method of performing a calibration procedure that is indicated by the flowchart of FIGS. 9A and 9B.

In block 905, a wireless charger, such as wireless charger 105 shown in FIG. 2, is configured to transmit a reference wireless charge. The configuration procedure includes setting variable frequency charge transmitter 215 in wireless charger 105 to a reference frequency; using the reference frequency to generate the reference wireless charge at a certain power level that may be based on various factors (such as for example, the separation distance between wireless charger 105 and wirelessly chargeable device 110); and setting transmission circuitry (a tunable circuit for example) to propagate the reference frequency.

In block 910, the reference wireless charge is transmitted out of wireless charger 105 via a power charge coupling device (not shown), such as, for example, an inductive coil (which in one embodiment is a part of a transformer).

A wirelessly chargeable device, such as wirelessly chargeable device 110 of FIG. 2, receives the reference wireless charge via an inductive coil (not shown) that provides inductive power charge coupling with the inductive coil located in wireless charger 105. It should be understood that other power charge coupling elements including capacitive elements may be used in place of the inductive elements described above.

In subsequent blocks of the flowchart, a method is implemented in which a variable circuit element of wireless power charge receiver 118 is set to a variety of values (capacitive values, inductive values etc.) and for each one of this variety of values, a corresponding amount of power that propagates through tunable resonant circuit 220 is measured. Once all the power measurements have been carried out, the measured power values are examined for determining which particular setting/value of the variable circuit element provides the maximum amount of power out of tunable resonant circuit 220.

As can be understood, the variable circuit element of wireless power charge receiver 118 can be set to any number of settings based on various factors, such as for example, a desired precision of measurement, and/or a setting resolution provided by the variable circuit element, which may be in various embodiments, a continuously variable element capable of providing a wide number of settings (e.g. a variable capacitor with movable plates), or may be a stepped variable element capable of providing a pre-determined number of settings (e.g. a switched capacitor network providing a predetermined number of capacitance values). The variable number of settings is therefore referred to below as "n," and the set of values provided by the variable circuit element for these "n" settings is referred to as "$V_x$" (x=1, 2, 3 ... n).

In block 915, a variable circuit element of wireless power charge receiver 118 is set to a first value "$V_1$" in the set of values "$V_x$" (x=1, 2, 3 ... n). For example, in one exemplary implementation, a variable capacitor located in tunable resonant circuit 220 is set to a first capacitance value. This setting operation, as well as the various kinds of stored values associated with this setting procedure, has been described above.

In block 920, the reference power charge is received in wirelessly chargeable device 110, propagated through tunable resonant circuit 220, and measured at an output node (not shown) of tunable resonant circuit 220. The measured power level is referred to herein for purposes of description as "retrieved power level." During this first pass through the flowchart, the retrieved power level depends on the first value "$V_1$" set in block 915. As can be understood this value may not necessarily be the most appropriate value for obtaining the maximum amount of power out of tunable resonant circuit 220.

In block 925, the retrieved power level ($P_1$) is stored in wirelessly chargeable device 110, for example, in memory 210 via controller 117. In certain embodiments, the value "$V_1$" may be stored in lieu of, or in addition to the retrieved power level.

In block 930, a determination is made to find out if additional settings have to be carried out upon the variable circuit element. As described above, these additional settings will be carried out according to the value "n" that is pre-selected on the basis of various factors (desired precision of measurement, resolution etc.). In one implementation, the determination carried out in block 925 corresponds to checking if x="n."

Assuming that "n" has been pre-selected to be greater than 1, which would be typical, given that it is desirable to find out which particular setting of the variable circuit element provides the maximum amount of power out of tunable resonant circuit 220, operation of the flow chart moves from block 930 to block 935.

In block 935, the value "$V_1$" is set to the next value amongst "$V_x$." This is carried out by incrementing "x." Specifically, during the first pass through the flow chart, "$V_1$" is changed to "$V_2$." In the next pass "$V_2$" is changed to "$V_3$" and so on until processing of "$V_n$" is completed.

From block 935, action moves to block 920, and thereon to blocks 925, 930 and 935 in a loopback path, incrementing "x" each time until $V_n$ is executed. In other words, the loopback process is executed "n" number of times, thus measuring and storing $P_1$ through $P_n$ retrieved power levels.

Upon completion of the "$n^{th}$" execution, as a result of determination block 930, action proceeds to block 940 (FIG. 9B) wherein controller 117, for example, reads a table stored in memory 210, to identify an optimal retrieved power level "$P_{optimal}$" and from this identified optimal retrieved power level "$P_{optimal}$" identify an optimal value "$V_{optimal}$" that was used to obtain this optimal retrieved power level "$P_{optimal}$."

The optimal value "$V_{optimal}$" provides an indication as to what capacitance value, for example, would be optimal for retrieving the maximum amount of power from the reference power charge transmitted by wireless charger 105 to wirelessly chargeable device 110 at a particular frequency.

It should be understood that the optimal value "$V_{optimal}$" would typically be different when the reference power charge is transmitted at a different frequency.

In block 945, in one embodiment, the optimal value "$V_{optimal}$" and/or the optimal retrieved power level "$P_{optimal}$" is communicated by wirelessly chargeable device 110 to wireless charger 105. Wireless charger may use this information to determine frequency allocation and power charge level amplitudes for subsequently providing a steady state charge to wirelessly chargeable device 110.

In another embodiment, rather than implementing block 945 as shown in FIG. 9B, a data parameter or index that is indicative of one or more retrieved power levels is communicated by wirelessly chargeable device 110 to wireless charger 105 in lieu of or in addition to, the optimal value "$V_{optimal}$" and/or the optimal retrieved power level "$P_{optimal}$." Wireless charger may use the data parameter or index to determine frequency allocation and power charge level amplitudes for subsequently providing a steady state charge to wirelessly chargeable device 110.

In yet another embodiment, rather than implementing block 945 as shown in FIG. 9B, all or some of the $V_n$ and/or $P_n$ values are communicated by wirelessly chargeable device 110 to wireless charger 105. Wireless charger uses some or all of these $V_n$ and/or $P_n$ values to determine frequency allocation and power charge level amplitudes for subsequently providing a steady state charge to wirelessly chargeable device 110.

It will be understood that in some implementations, the flowchart shown in FIGS. 9A and 9B and/or the variants described above, is executed multiple times using various frequencies, so as to determine the optimal value "$V_{optimal}$" not only in wirelessly chargeable device 110, but in other wirelessly chargeable devices as well. Based on this multiple execution, wirelessly chargeable device 110 may determine which specific frequencies to use for which specific wirelessly chargeable device in order to provide a steady state charge to each of the several wirelessly chargeable devices. This procedure is described below in further detail using FIG. 10.

Figure 10:
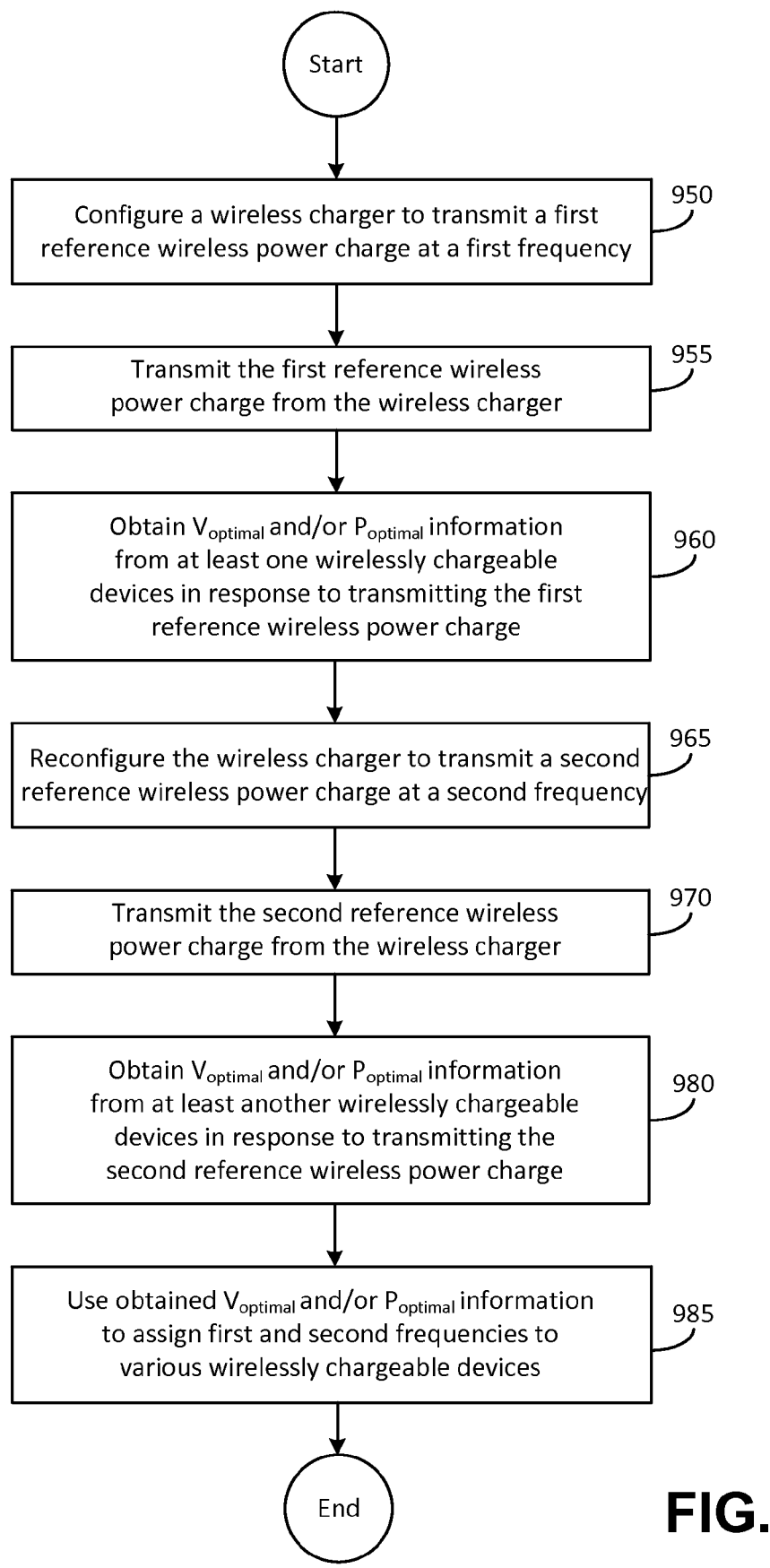
FIG. 10 shows an exemplary flowchart for a method for executing an assignment procedure in accordance with the invention.

FIG. 10 shows a flowchart for an exemplary method of assigning frequencies and providing configuration information to a plurality of wirelessly chargeable devices, in accordance with the invention.

The operations indicated in blocks 950, 955 and 960 may be understood in the context of the description provided above with reference to FIGS. 9A and 9B which teaches a method of identifying "$P_{optimal}$" and/or "$V_{optimal}$" parameters for a first frequency from a first wirelessly chargeable device.

In block 965, wireless charger 105 is reconfigured to transmit a second reference wireless power charge at a second frequency. Blocks 970 and 980 indicate a method of obtaining "$V_{optimal}$" and/or "$P_{optimal}$" parameters for a second frequency from a second wirelessly chargeable device.

In block 985, the two sets of "$V_{optimal}$" and/or "$P_{optima}$" parameters obtained via execution of the preceding blocks is used by wireless charger 105 to assign the first and the second frequencies to the first and second wirelessly chargeable devices respectively (or vice-versa).

Upon determination of the assignment, the assigned frequency and/or "$V_{optimal}$" and/or "$P_{optimal}$" parameters are communicated by wireless charger 105 to the respective wirelessly chargeable devices. Each of the wirelessly chargeable devices uses this information to suitably configure their respective tunable resonant circuit 220 for receiving the steady state wireless power charge at the assigned frequency.

It should be understood that blocks 950 through 980 may be replicated multiple times in order to identify "$V_{optimal}$" and/or "$P_{optimal}$" parameters that may be used to assign various frequencies to a number of wirelessly chargeable devices. In certain embodiments, each of the wirelessly chargeable devices may be assigned a unique frequency, while in some other embodiments, two or more of the wirelessly chargeable devices may be assigned an identical frequency.

The person skilled in the art will appreciate that the description herein is directed at explaining calibration and assignment procedures whereby one or more assigned wirelessly chargeable devices are optimally configured to receive a steady state power charge at one or more frequencies from one or more wireless chargers.

While the systems and methods have been described by means of specific embodiments and applications thereof, it is understood that numerous modifications and variations could be made thereto by those skilled in the art without departing from the spirit and scope of the disclosure.

Accordingly, it is to be understood that the inventive concept is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. A system comprising:
   a wireless charger, comprising:
   a first power charge transmitter; and
   a controller unit operable to configure the first power charge transmitter to transmit a first reference wireless power charge at a first frequency, the first reference wireless power charge operative to permit one or more wirelessly chargeable devices to execute a calibration procedure; and
   a first wirelessly chargeable device configured for executing the calibration procedure in the first wirelessly chargeable device, the first wirelessly chargeable device comprising:
   a variable circuit element configured for executing a series of adjustments as a part of the calibration procedure to determine a first optimal setting whereby the first reference wireless power charge is optimally retrieved in the first wirelessly chargeable device; and
   a storage device configured for storing a plurality of settings of the variable circuit element obtained during execution of the series of adjustments.

2. The system of claim 1, wherein the first wirelessly chargeable device further comprises:
   a controller operable to access the storage device and identify the first optimal setting amongst the plurality of settings stored in the storage device.

3. The system of claim 2, wherein the variable circuit element is a capacitor and the plurality of settings stored in the storage device comprises a plurality of capacitance values.

4. The system of claim 1, wherein the wireless charger further comprises a second power charge transmitter; and wherein the controller unit is further operable to configure the second power charge transmitter to transmit a second reference wireless power charge at a second frequency.

5. The system of claim 4, wherein the first wirelessly chargeable device is further configured to execute the calibration procedure for determining a second optimal setting of the variable circuit element whereby the second reference wireless power charge is optimally retrieved in the first wirelessly chargeable device.

6. The system of claim 5, wherein the wireless charger further comprises a wireless communication system configured to communicate with the first wirelessly chargeable device and direct the first wirelessly chargeable device to set the variable circuit element to one of the first or the second optimal setting based on at least one of: a) calibration results data received in the wireless charger from the first wirelessly chargeable device or b) an assignment procedure implemented in the wireless charger.

7. The system of claim 6, wherein the wireless charger is configured to replace the first reference wireless power charge with a steady-state wireless power charge after a period of time, the steady-state wireless power charge using at least one of the first or the second frequency.

8. A method comprising:
transmitting from a wireless charger, a first reference wireless power charge at a first frequency for a first period of time, the first reference wireless power charge operative to permit one or more wirelessly chargeable devices to execute a calibration procedure associated with wireless power charging of the one or more wirelessly chargeable devices;
receiving the first reference wireless power charge in a first wirelessly chargeable device amongst the one or more wirelessly chargeable devices;
executing a calibration procedure for identifying an optimal retrieved power level in the first wirelessly chargeable device, the calibration procedure comprising:
manipulating a variable circuit element to provide "N" different impedances in a propagation path of the first reference wireless power charge;
obtaining "N" different retrieved power level measurements associated with providing the "N" different impedances in the propagation path of the first reference wireless power charge;
identifying the optimal retrieved power level measurement in the "N" different retrieved power level measurements; and
identifying a first impedance associated with the optimal retrieved power level measurement;
setting the variable circuit element to provide the first impedance in the propagation path of the steady-state wireless power charge received in the first wirelessly chargeable device after the first period of time;
discontinuing transmitting of the first reference wireless power charge after the first period of time; and
transmitting a steady-state wireless power charge at the first frequency for transferring power to the one or more wirelessly chargeable devices.

9. The method of claim 8, wherein providing the "N" different impedances in the propagation path of the first reference wireless power charge comprises providing the "N" different impedances in a tunable resonant circuit located in the first wirelessly chargeable device.

10. The method of claim 9, further comprising:
transmitting from the wireless charger, a second reference wireless power charge at a second frequency for a second period of time.

11. The method of claim 9, further comprising:
receiving the second reference wireless power charge in at least one of the first wirelessly chargeable device or a second wirelessly chargeable device amongst the one or more wirelessly chargeable devices; and
executing the calibration procedure in the at least one of the first or second wirelessly chargeable devices for identifying an optimal retrieved power level with reference to the second reference wireless power charge at the second frequency.

12. The method of claim 11, further comprising:
when the second reference wireless power charge is received in both the first and the second wirelessly chargeable devices, configuring one of the first or second wirelessly chargeable devices to prevent performing of the calibration procedure during execution of the calibration procedure in the other one of the first or the second wirelessly chargeable devices.

13. The method of claim 12, further comprising the wireless charger assigning the first frequency to the first wirelessly chargeable device and the second frequency to the second wirelessly chargeable device based on at least one of a) calibration results data received in the wireless charger from at least one of the first or second wirelessly chargeable devices or b) an assignment procedure implemented in the wireless charger.

14. The method of claim 13, further comprising the wireless charger defining a first group and a second group, the first group comprising the first wirelessly chargeable device, and the second group comprising the second wirelessly chargeable device.

15. The method of claim 14, wherein the wireless charger provides the steady-state wireless power charge at the first frequency and the steady-state wireless power charge at the second frequency in a time multiplexed format that is based on the defined first and second groups.

16. A system comprising:
a wireless charger configured to transmit a first reference wireless power charge at a first frequency, the first reference wireless power charge operative to permit one or more wirelessly chargeable devices to execute a calibration procedure prior to receiving a first steady-state wireless power charge from the wireless charger at the first frequency; and further configured to transmit a second reference wireless power charge at a second frequency, the second reference wireless power charge operative to permit the one or more wirelessly chargeable devices to execute the calibration procedure prior to receiving a second steady-state wireless power charge from the wireless charger at the second frequency, wherein the first reference wireless power charge is transmitted during a first period of time that at least partially overlaps a second period of time during which the second reference wireless power charge is transmitted.

* * * * *